April 22, 1952     O. VON ZELEWSKY     2,593,706
CLAMPING DEVICE FOR MACHINE TOOLS Filed April 18, 1950     2 SHEETS—SHEET 1

INVENTOR:
Ottomar von Zelewsky

BY

ATTORNEYS

April 22, 1952     O. VON ZELEWSKY     2,593,706
CLAMPING DEVICE FOR MACHINE TOOLS Filed April 18, 1950     2 SHEETS—SHEET 2

INVENTOR:
Ottomar von Zelewsky
BY
Richards y Geier
ATTORNEYS

Patented Apr. 22, 1952

2,593,706

UNITED STATES PATENT OFFICE 2,593,706

CLAMPING DEVICE FOR MACHINE TOOLS

Ottomar von Zelewsky, Neuhausen on the Rheinfall, Switzerland, assignor to Georg Fischer Aktiengesellschaft, Schaffhausen, Switzerland, a company of Switzerland Application April 18, 1950, Serial No. 156,540
In Switzerland January 18, 1950

1 Claim. (Cl. 279—35)

This invention relates to machine tools, and refers more particularly to a clamping device for holding the work on said machine tools.

An object of the present invention is the provision of a driver for lathes which will grasp automatically a work piece mounted between two points when the lathe spindle is switched on, the work piece being clamped without the use of keys and being effectively rotated by the driver.

Another object of the present invention consists in the provision of a device having fingers or holders which can conveniently grasp castings or forged pieces which are not quite round in cross-section and which, nevertheless, must be supported between two points.

Other objects of the present invention will become apparent in the course of the following specification.

The present invention is concerned with a driver for lathes having, at least, two cams or levers swingably mounted upon a supporting ring and engaging driver bolts provided upon a flange ring, the cams being formed as centrifugal weights so that when the flange ring is rotated the centrifugal forces produced by the cams turn the supporting ring in a direction opposed to the direction of rotation of the flange ring and, thereby, move the supporting ring into a clamping position.

An important feature of the present invention resides in that the supporting ring which is mounted with radial play in an immovable flange ring is centered by springs which are located partly in annular front grooves of the flange ring and partly in corresponding recesses of the supporting ring, the ends of the springs engaging the supporting ring and the flange ring in such manner that the supporting ring can be turned into a position wherein the cams assert their clamping action.

The invention will appear more clearly from the following detailed description, when taken in connection with accompanying drawings showing, by way of example, a preferred embodiment of the inventive idea.

Figure 3:
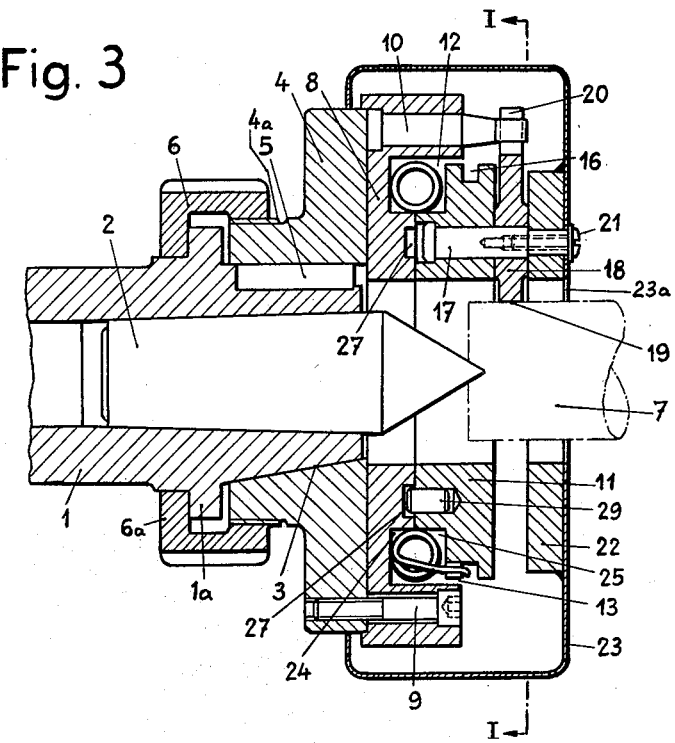
Figure 3 is a longitudinal section along the lines III—III of Figure 1.

A lathe which is not shown in the drawings has a spindle 1, provided with a projecting end 2 which is illustrated in Figure 3. The front end 3 of the spindle 1 is conical in form and is enclosed by a ring-shaped flange 4. A key 5 extends into the spindle end 3 and the flange 4 and connects the flange 4 firmly with the spindle.

A rear surface 4a of the flange 4 is provided with screw threads which mesh with corresponding threads of a ring 6. The ring 6 has a rear flange portion 6a engaging a flange 1a constituting a part of the spindle 1. Due to this arrangement the flange 4 is held firmly upon the spindle 1.

The work piece 7 is indicated diagrammatically in Figure 3 and is supported at its front end by the projecting member 2. A tailstock, not shown, supports the rear end of the work piece 7.

Figure 1:
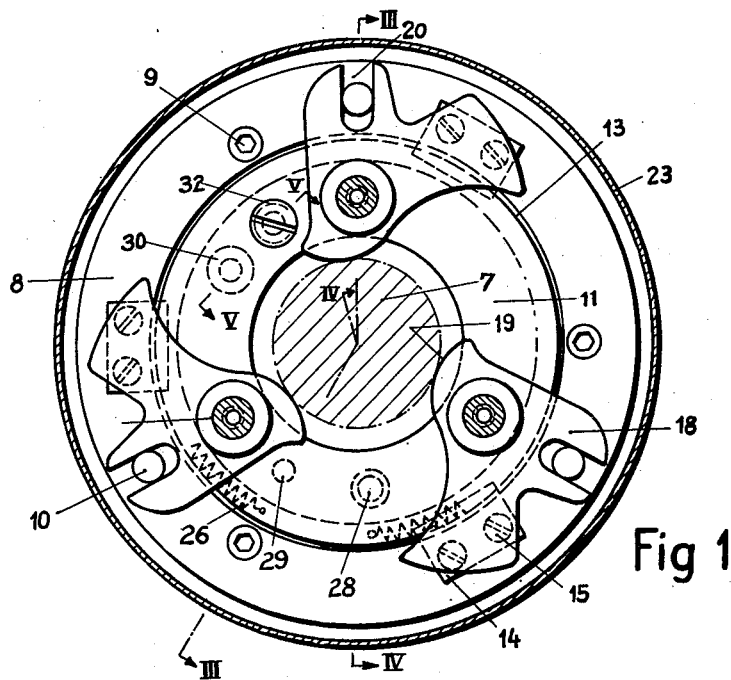
Figure 1 is a front view of the follower, while the covering ring is shown in section along the line I—I of Figure 3, the cams being shown in their clamped position.

As best shown in Figures 1 and 3, bolts 9 extend through a flange ring 8 and are screwed into threaded openings provided upon the spindle flange 4 so that the flange ring 8 is firmly connected with the spindle flange 4. Three bolts 9 are provided in the construction shown by way of example in the drawings.

Three driver bolts 10 are mounted upon the flange ring 8 and project from the front surface thereof. The bolts 10 are equally spaced, one from the other, and are located in suitable recesses formed in the flange ring 8. The front surface of the flange ring 8 is recessed at 12 and contains a supporting ring 11 which is rotatable in relation thereto. The outer diameter of the supporting ring 11 is smaller than the corresponding diameter of a recess 12 so that an annular gap 13 is provided between the flange ring 8 and the supporting ring 11, thus making it possible for the movable supporting ring 11 to be shifted somewhat radially in relation to the immovable flange ring 8. This arrangement makes it possible to clamp and to rotate conveniently work pieces which do not have a precisely round form, such as castings or forged pieces which, however, are held between two points.

Figure 4:
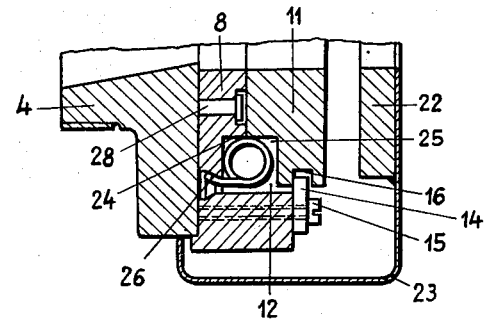
Figure 4 is a section along the line IV—IV of Figure 1.

In the example illustrated there are three guide pieces 14 (Figs. 1 and 4), which are equally spaced, one from the other, and which are held by bolts 15 screwed into the flange ring 8. The guide members 14 project into an annular groove 16 provided upon the side surface of the supporting ring 11. Due to this arrangement the supporting ring 11 is prevented from being shifted axially.

The front surface of this supporting ring 11 carries three bolts 17 which are held firmly in recesses formed in the supporting ring 11 at equal distances, one from the other. Each of the bolts 17 carries a separate cam lever 18 which is mounted thereon with small axial play. The cam levers 18 have clamping surfaces 19 which extend approximately in accordance with a logarithmic spiral, and which are roughened or knurled. The cam levers 18 also have recesses or slots 20 containing the bolts 10 which are mounted upon the immovable flange ring 8.

A casing or cover 23 is held by bolts 21 which extend through a supporting ring 22 and which are screwed into threaded openings provided in the bolts 17, which are firmly connected with the supporting ring 11. The casing 23 has a central opening 23a through which the work piece 7 extends.

Figure 2:
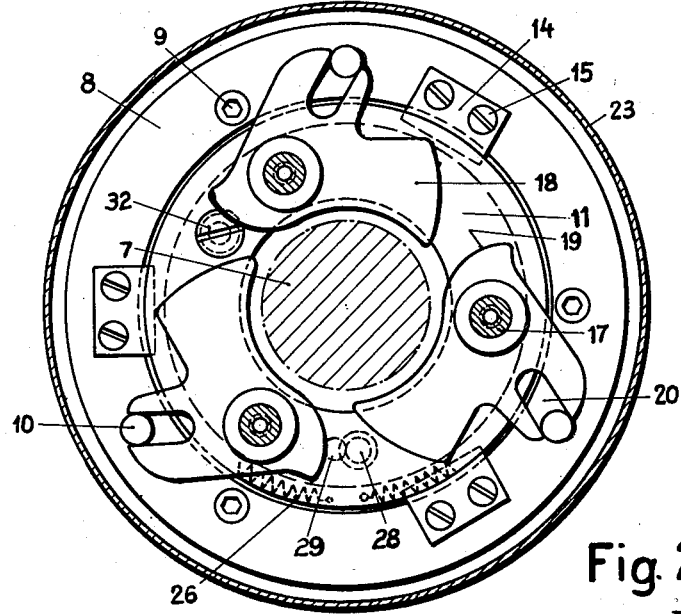
Figure 2 is similar to Figure 1 but shows the cams in their inoperative positions.

The immovable flange ring 8 has an annular front groove 24 constituting a part of the recess 12 and located opposite a corresponding recess 25 provided in the movable supporting ring 11. A helical spring 26 is located in the grooves 24 and 25. As best shown in Figure 1, the helical spring 26 has one end connected to the flange ring 8 and another end connected to the supporting ring 11. The helical spring 26 tends to center the supporting ring 11 in relation to the flange ring 8, and to turn the movable supporting ring 11 clockwise in relation to the immovable flange ring 8 (looking in the direction of Figures 1 and 2), so that the cam levers assume the clamping position shown in Figure 1.

Figure 5:
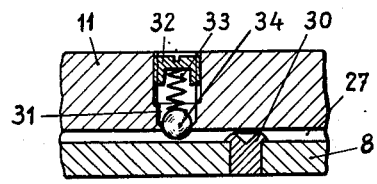
Figure 5 is a section along the line V—V of Figure 1.

The immovable flange ring 8 has a further annular front groove 27 shown in Figures 3 and 5 and containing a projecting bolt 28 and a stop 30, which has the form of a pin provided with a recessed head.

The supporting ring 11 carries a pin 29 which may be located opposite the pin 28. A passage 31 is formed in the ring 11 and may be located opposite the pin 30. The passage 31 holds a ball 34 which projects into the groove 27 and which is engaged by a spring 33 held in place by a threaded cap 32 which is screwed into the threaded passage 31. The ball 34 is pressed into the recess of the pin 30 in the open position of the cam levers. As shown in Figure 5, the opening of the passage 31 into the groove 27 is of reduced diameter so that the ball 34 cannot fall out.

The operation of the device is as follows:

When the cam levers are not being moved the radially movable supporting ring 11 is centered in the immovable flange ring 8 by the force of the helical spring 26, and is also turned counterclockwise so that the knurled or roughened clamping surfaces 19 of the cam levers 18 are pressed against the outer surfaces of the work piece 7. When the cam levers are rotated, centrifugal forces are produced, asserting a turning movement upon the cam levers 18 so that the latter are further pressed against the work piece 7. This pressure created by the centrifugal forces is added to the pressure asserted by the helical spring 26. Thus, due to this arrangement, and due to the illustrated form of the cam levers 18, they operate as centrifugal weights.

When it is necessary to free the work piece 7 from the clamping action of the cam levers, then the operator turns by hand the casing 23 which is firmly connected with the movable supporting ring 11. The casing 23 is turned in the direction of rotation during this operation, namely, against the action of the helical spring 26. Then, the cam levers 18 are turned about their pivots and will move away from the work piece 7.

The casing 23 is moved by the operator against the action of the springs 26 until the ball 34 springs into the recess of the stop 30 and, thereby, holds the supporting ring 11 upon the flange ring 8 in a position in which the cam levers remain open. In this end position, the pin 29 strikes the pin 28, thereby limiting the turning movement of the casing 23 along with the movable supporting ring 11 in relation to the immovable flange ring 8.

The work piece 7 also may be removed in a different manner, namely, by turning it in the direction of the working operation, whereupon the clamping force between the cam levers 18 and the work piece 7 is eliminated.

Yet another way of removing the work piece is to withdraw the tailstock, which is not shown in the drawings, and then to incline the work piece 7 slightly, whereupon the cam levers 18 will also free the work piece.

It is apparent that the example shown above has been described solely by way of illustration and not by way of limitation, and that it is subject to many variations and modifications without departing from the scope or intent of the present invention. All such variations and modifications are to be included within the scope of the present invention.

What is claimed is:

A clamping device for machine tools, said device comprising in combination with a spindle; a flange ring connected to said spindle, at least two bolts carried by said flange ring, a supporting ring within said flange ring, means for radially shifting the supporting ring relative to the flange ring, at least two work holders pivotally mounted upon said supporting ring, each of said work holders engaging a separate bolt, the mass of each of said work holders being so disposed in relation to its pivot as to press the holder inwardly during rotation, two springs located in recesses formed in said flange ring and supporting ring, each of said springs having one end connected to said flange ring and another end connected to said supporting ring to turn said supporting ring in a direction in which said work holders are pressed inwardly, a lock pin carried by said flange ring, and a resilient bolt carried by said supporting ring and engaging said lock pin to hold said supporting ring in the open position of said holders.

OTTOMAR VON ZELEWSKY.

REFERENCES CITED

The following references are of record in the file of this patent:

UNITED STATES PATENTS

| Number | Name | Date |
| --- | --- | --- |
| 846,193 | Fellows | Mar. 5, 1907 |
| 1,149,148 | Miller | Aug. 3, 1915 |
| 1,306,588 | France | June 10, 1919 |
| 1,864,191 | Eidam | June 21, 1932 |
| 2,471,038 | Luginbuke | May 24, 1949 |

FOREIGN PATENTS

| Number | Country | Date |
| --- | --- | --- |
| 690,501 | Germany | Apr. 26, 1940 |